(No Model.)   S. G. WILBER.   2 Sheets—Sheet 2.
CAR BRAKE.
No. 526,513.   Patented Sept. 25, 1894.
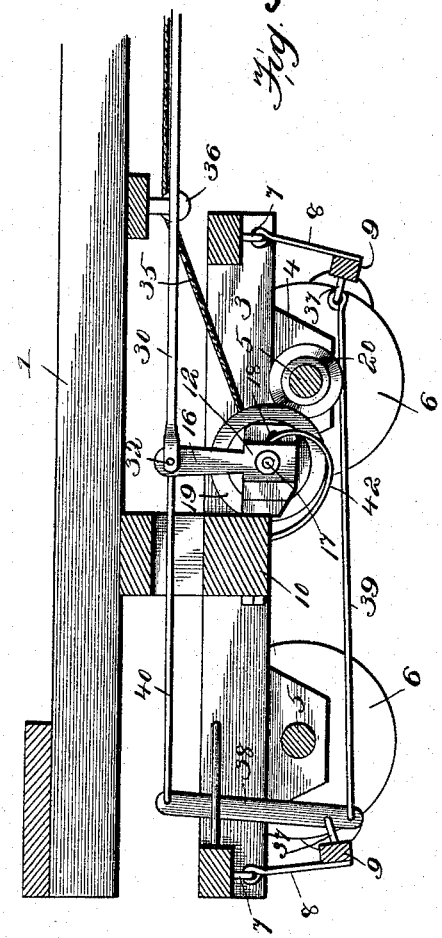
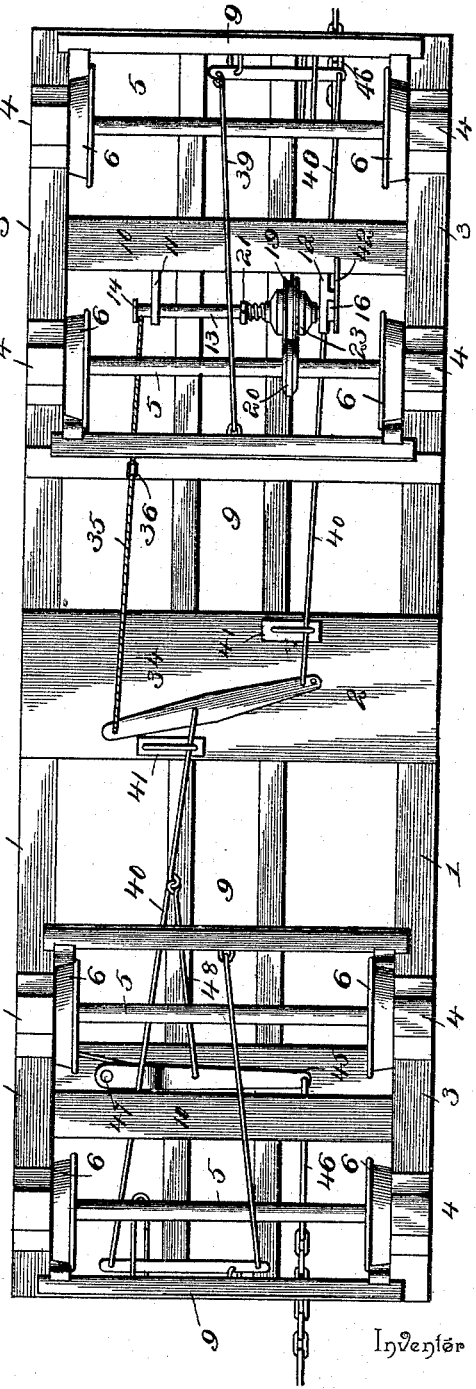
Witnesses:
John C. Shaw
W. S. Duvall
By Jos. Attorneys,
Inventor
Samuel G. Wilber.
C. A. Snow & Co.

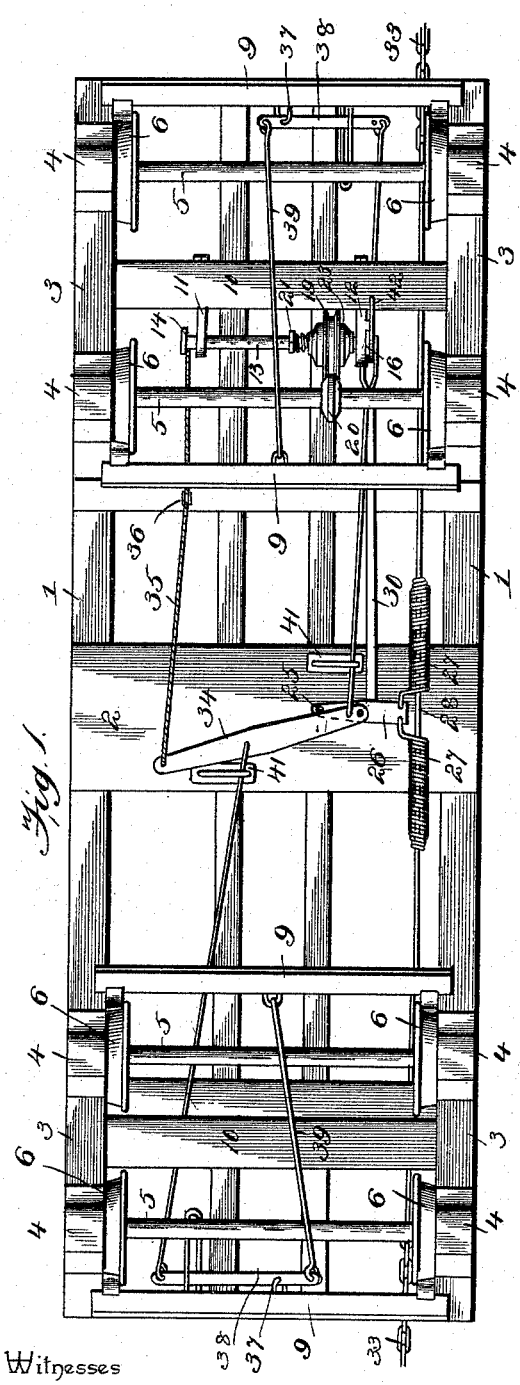

UNITED STATES PATENT OFFICE.

SAMUEL G. WILBER, OF LAKE HILL, NEW YORK.

CAR-BRAKE.

SPECIFICATION forming part of Letters Patent No. 526,513, dated September 25, 1894.

Application filed May 20, 1893. Renewed August 22, 1894. Serial No. 521,002. (No model.)

*To all whom it may concern:*

Be it known that I, SAMUEL G. WILBER, a citizen of the United States, residing at Lake Hill, in the county of Ulster and State of New York, have invented a new and useful Car-Brake, of which the following is a specification.

My invention relates to improvements in car brakes; the objects in view being to provide a mechanical brake that may be applied either from the car itself and from this point to a train of cars, or from the cab of the engine throughout a train of cars; to provide for a gradual application of the brake; and to so construct the brake mechanism as to utilize the rotations of the wheels for the purpose of creating the brake power, or in other words, operating the brake.

Various other objects and advantages of the invention will appear in the following description, and the novel features thereof will be particularly pointed out in the claims.

Referring to the drawings:—Figure 1 is a bottom plan view of a car provided with the brake mechanism embodying my invention. Fig. 2 is a similar view, the brake being applied. Fig. 3 is a vertical sectional view through that truck of the car employing the winding mechanism, the latter being shown in side elevation. Fig. 4 is a bottom plan view of a modified construction of brake mechanism operating upon the same principle.

Like numerals of reference indicate like parts in all the figures of the drawings.

The framing of the car is of the usual construction and therefore includes the longitudinal timbers 1 and cross timbers 2, and the rectangular truck frame 3 serves to support the same. The truck frame is provided with the usual journal boxes 4 and the pairs of axles 5 upon which are secured the ordinary car wheels 6. To each of the end bars of the truck frames eyes 7 are applied, and from the eyes depend links 8 whose lower ends are attached to a transverse brake bar 9, the said bars carrying brake-shoes for application to the peripheries of the wheels 6. To the central transverse beam 10 of either one of the truck frames there is applied a pair of inwardly extending transversely opposite bearing brackets 11 and 12, and in the same is journaled a transverse winding shaft 13, one end of which extends beyond the bearing bracket 11 and constitutes a winding drum 14. The bracket 12 is provided with a transverse slot in which the end of the winding shaft is located, and in rear of the same upon its exterior side is provided with a shoulder 15. A vertical lever 16 is pivoted at its lower extremity, as at 17, to the bracket 12 below its transverse slot and has a bearing eye 18 in which the end of the shaft 13 takes and revolves, so that as will be obvious, by an inward movement of the upper end of the lever or an outward movement of said end, the shaft is swung inward and in this manner a friction wheel 19, which is loosely mounted upon the winding shaft, may be brought into contact with a friction wheel 20 carried by the adjacent axle 5. The wheel 19 is preferably flanged so as to receive and guide the wheel 20 into frictional contact therewith, the latter wheel being beveled at its opposite sides so as to be readily guided to position.

The winding shaft is threaded at one side of the friction wheel 19, and upon the same is mounted a nut or collar 21, a stiff coiled spring being interposed between said nut or collar and the hub of the wheel 19, whereby through the medium of said nut or collar and spring the wheel may be forced toward a fixed collar 23 with which the said winding shaft is provided adjacent to the bearing bracket 12. In this manner the frictional contact of the face of the frictional wheel with the fixed collar of the winding shaft may be regulated, all for a purpose hereinafter apparent.

Upon a stud 25 which depends from the central transverse timber 2 of the framing, there is loosely pivoted one end of a lever 26, the outer end of said lever having eyes and being connected to the inner ends of a pair of oppositely disposed coiled springs 27 whose outer ends are closed by a contraction of the coils. A brake rod 28 passes through these coiled springs and terminates at the ends of the car and is provided with stops 29 at the contracted ends of the coiled springs so that when the rod is drawn in either direction movement is communicated to the lever 26, but in a yielding manner. A connecting rod 30 leads from the lever 26 to which it is pivoted as at 31 to the upper end of the shifting lever that operates the winding shaft, being pivoted as at 32 to the latter. Chains or cables 33 are applied to the ends of the brakerod and are supposed to be connected to the corresponding ends of similar brake rods of the adjacent cars, and so on throughout the system, as will be obvious. If desired, however, the coupling chain may lead to an ordinary brake shaft operated by a hand-wheel, lever, or otherwise, instead of extending to the cab of the engine, such being a detail to which I do not limit my invention and which will be varied according to the location of the parts. At any rate, regardless of the point to which the brake rod may lead or the direction in which it may be drawn, its operation upon the shifting lever is the same, that is to move the winding shaft so that its friction wheel 19 will engage with the friction wheel 20 of the axle, and thus the rotary motion of the latter wheel will be communicated to the former wheel and to the winding shaft, all for a purpose hereinafter described.

An evener-bar 34 is located under the cross timber 2, and a cable or chain 35 is connected to one end of the same, passes over a guide-pulley 36 secured to one of the timbers, and is connected to the drum portion of the winding shaft 13. Each of the outer brake bars 9 has an eye 37, and in the same is loosely fulcrumed a vertical lever 38. The lower end of the lever is by a rod 39 loosely connected to the companion brake bar of the truck, and the upper ends of the two levers are by rods 40 connected to an intermediate point of the evener-bar 34, and to that end thereof not connected with the cable or chain 35, the said rods 40 passing through guide-eyes 41 that are located upon the under side of the timber 2 and which serve to support the inner ends of the rods, and the latter serve to support the evener-bar 34.

A bowed spring 42 depends from the crossbeam 16 and rests against the inner side of the shifting lever, thus serving to normally draw the same inward so that the friction wheel carried by the winding shaft is out of contact with the friction wheel of the axle.

This completes the construction, and the operation of the invention is as follows: The brake-rod 28, as before stated, may be operated by any suitable means, either at the command of the engineer when stationed in his cab or at the command of the brakeman upon the car. The result is the same in any instance, namely. A yielding force is applied to the lever 26, which through the medium of the rod 30 is communicated to the shifting lever, thus drawing the winding shaft inward so that its friction wheel 19 contacts with the friction wheel 20 of the adjacent axle. The axle revolving it will be seen communicates a rotary motion to the aforesaid winding shaft, thus winding the cable or chain 35 upon its drum. Such movement upon the part of the cable or chain causes the evener-bar 34 to draw upon the rods 40, which operates the levers 38 and the outer brake bars 9, and through the medium of connecting rods 39 the inner brake bars 9 are likewise operated, so that as a result the brake shoes are drawn against the peripheries of the wheels and the brake is "on." The intensity of pressure exerted by the shoes upon the wheels before the winding shaft ceases its rotations and its friction wheel therefore rotates loosely thereon, is regulated through the medium of the adjusting nut of the winding shaft, which as before stated increases the frictional contact between the said frictional wheel 19 and the collar of the winding shaft. By tightening this nut the brakes may be applied sufficiently strong to absolutely lock the wheels against any movement whatever and almost instantly, or their movements may be arrested gradually, as may be desired. It will be seen that each car of a train being thus provided the application of the brakes to one will through the connections apply the brakes to all, so that a train may be braked throughout, either from a car or from the engine.

Various changes may be made in the details of my invention without departing from the principle or sacrificing any of the advantages thereof, and I therefore do not limit the invention to such details as I have herein shown.

In Fig. 4 I have illustrated a slightly modified construction, in which I omit the brake rod 28 and its springs, and substitute therefor a lever 45, and connect a brake rod 46 with the outer end of this lever, the rod extending rearward to the shifting lever of the following car. The inner end of the lever is pivoted as at 47 to one of the transverse frame bars, and a spring normally holds it in position. A rod 48 connects the said lever at an intermediate point with the adjacent rod 40.

Having described my invention, what I claim is—

1. The combination with a truck, an axle, the wheels, and the brake devices, of a friction wheel 20 arranged upon the axle, a rotatable and oscillatory winding shaft journaled adjacent to the axle, a cable or chain connected therewith, devices between the cable or chain and the brakes, a loose friction wheel 19 mounted on the winding shaft and adapted to engage the wheel 20 on the axle, a stationary collar 23 on the winding shaft at one side of the wheel 19, and means for increasing or diminishing the frictional contact between the wheel 19 and the collar 23, substantially as specified.

2. The combination with a truck, an axle, the wheels, and the brake devices, of a friction wheel arranged upon the axle, a rotatable and oscillatory winding shaft journaled adjacent to the axle, a cable or chain connected therewith, and devices between the cable or chain and the brakes, a loose friction wheel mounted on the winding shaft, a stationary collar at one side of the wheel, a threaded portion arranged at the opposite side of the wheel, a nut upon the threaded portion, and a coiled spring upon the shaft between the nut and the wheel, substantially as specified.

3. The combination with the truck, the wheels, the brake devices, the adjacent rotatable and oscillating winding shaft, the cable or chain connected therewith, and devices between the same and the brake mechanism, of a lever for oscillating said winding shaft, a spring for normally drawing the lever in one direction, a lever pivoted at one end to the under side of the car, a connecting rod between an intermediate point of said lever and the end of the shaft operating lever, a brake rod passing under the car adjacent to the free end of said pivoted lever, coiled springs oppositely disposed and connected to the free end of said pivoted lever and receiving the brake rod, such springs having outer contracted ends, and stops arranged upon the brake rod at said ends, substantially as specified.

4. The combination with the opposite truck frames, the axles, the ground wheels, and the loosely suspended brake bars located at opposite sides of the wheels, of the levers pivoted between their ends to the outer brake bars, connecting rods between the lower ends of the levers and the inner brake bars, an intermediate evener, a connecting rod leading from the upper end of one of said levers to an intermediate point of the evener, and a similar rod leading from one of the ends of the evener to the upper end of the remaining lever, a friction wheel 20 arranged upon one of the inner axles, a rotatable and oscillating winding shaft, a cable or chain connected to the free end of the evener and to said winding shaft, a loose, laterally-movable, spring actuated friction wheel 19 arranged upon the winding shaft, a projection or collar on the shaft with which the wheel is held in frictional contact, a spring 42 for drawing the winding shaft away from the axle, and means for swinging said winding shaft toward the axle whereby contact occurs between the two friction wheels, substantially as specified.

In testimony that I claim the foregoing as my own I have hereto affixed my signature in the presence of two witnesses.

SAMUEL G. WILBER.

Witnesses:
JOHN H. SIGGERS,
E. G. SIGGERS.